United States Patent [19]

Moriarty

[11] Patent Number: 4,947,825
[45] Date of Patent: Aug. 14, 1990

[54] SOLAR CONCENTRATOR - RADIATOR ASSEMBLY

[75] Inventor: Michael P. Moriarty, Simi Valley, Calif.

[73] Assignee: Rockwell International Corporation, El Segundo, Calif.

[21] Appl. No.: 405,165

[22] Filed: Sep. 11, 1989

[51] Int. Cl.[5] .................................................. F24J 2/18
[52] U.S. Cl. ...................................... 126/439; 126/438; 126/451; 343/781 P; 165/104.11; 60/641.15; 60/641.8
[58] Field of Search ................ 126/439, 438, 424, 425, 126/451; 343/781 P; 165/104.11, 104.21; 60/641.8, 641.13, 641.15

[56] References Cited

U.S. PATENT DOCUMENTS

| | | | |
|---|---|---|---|
| 3,064,534 | 11/1962 | Tumavicus | 126/451 X |
| 3,105,486 | 10/1963 | Glenn | 126/451 |
| 3,152,260 | 10/1964 | Cummings | 126/451 X |
| 3,903,699 | 9/1975 | Davis | 60/641.15 |
| 4,262,483 | 4/1981 | DeGeus | 60/641.8 |
| 4,286,581 | 9/1981 | Atkinson, Jr. | 126/439 |
| 4,353,212 | 10/1982 | Adler | 60/641.8 |
| 4,490,981 | 1/1985 | Meckler | 60/641.8 |
| 4,598,695 | 7/1986 | Niggemann | 126/438 X |
| 4,707,990 | 11/1987 | Meijer | 60/641.8 |
| 4,848,087 | 7/1989 | Parker et al. | 126/900 X |

Primary Examiner—Larry Jones
Attorney, Agent, or Firm—H. Frederick Hamann; Harry B. Field; Steven E. Kahm

[57] ABSTRACT

A combined solar concentrator and radiator assembly (10) is provided in a relatively lightweight and compact geometry adapted particularly for use in electrical power generation systems in space. The solar concentrator - radiator assembly comprises a solar reflector of the Cassegrain type having primary and secondary reflelctor surfaces (14) and (26) for concentrating incident solar ration upon a thermal powered generator unit (16). The primary reflector surface (14) is formed on one side of an array of interleaved panels (30) adapted for movement between a compact stowed profile to fit within the cargo bay of a transport vehicle, and an extended deployed configuration. The reverse sides of these panels define a space radiator of extended surface area connected to the generator unit (16) by heat transfer members such as heat pipes (34) for purposes of dissipating excess heat to the surrounding space environment.

8 Claims, 3 Drawing Sheets

SOLAR CONCENTRATOR - RADIATOR ASSEMBLY

BACKGROUND OF THE INVENTION

This invention relates generally to solar powered systems for generating electrical energy, particularly of the type used in space to generate electrical power for a satellite or other space vehicle. More specifically, this invention relates to an improved solar collector and related thermal powered generator unit in combination as a single lightweight and compact assembly with a space radiator for dissipating excess heat from the system.

Solar powered generator systems are generally known in the art for converting solar radiation energy into electrical power. Such generator systems are particularly useful in providing electrical energy to operate equipment in remote installation sites, especially such as space applications to operate the electrical systems of a satellite or other space vehicle. Solar powered generator systems typically include a relatively large collector surface exposed to incident solar radiation, in combination with conversion means for converting the incident radiation to electrical energy. In one form known generally as a dynamic power system, the collector surface comprises a reflector having a specially contoured parabolic mirror or the like for focusing and concentrating incident solar radiation upon a thermally driven generator unit, such as a heat exchange manifold containing a process fluid for driving a turbine generator or the like. In another form commonly known as a passive generator system, the collector surface comprises an extended surface area carrying photovoltaic cells designed to convert incident solar radiation into electrical energy.

Considerable design efforts have been directed toward improvements in the power generation efficiency of solar generator systems, while simultaneously reducing the overall size and weight of the generator package. Size and weight reductions of the solar generator system can be particularly significant in space applications to permit efficient storage and transport within the cargo bay of a transport and/or launch vehicle. Moreover, system size reduction can be especially desirable in the context of space defense systems to enhance the survivability of the solar generator system and the equipment powered thereby in the event of attack.

In many space power generation applications, dynamic systems using a solar reflector are often preferred in view of their relatively efficient power output from a compact, low profile system, in comparison with passive systems utilizing an extended array of photovoltaic cells. However, in dynamic power systems, the generator engine typically requires at least some excess or waste heat to be dissipated to the surrounding space environment for proper long term operation. In the past, such excess heat has been rejected to space by means of a radiator having an extended radiator surface area. Unfortunately, the combination of the solar reflector and the radiator as separate structures in a solar power system does not fully optimize the system into a highly compact, low profile geometry.

The present invention relates, therefore, to an improved solar powered generator system having a solar collector and associated radiator integrated into a single lightweight assembly of compact size and shape. The invention is particularly adapted for use in a dynamic power system wherein the solar collector and associated radiator are formed on the same structural substrate.

SUMMARY OF THE INVENTION

In accordance with invention, a combination solar collector and radiator are provided in a single integrated and highly compact construction for use in a solar power operation system. The solar collector and radiator are formed on opposite sides of the same structural substrate, such that the solar collector can be oriented in one direction for receiving incident solar radiation and the radiator will thus be oriented in an opposite direction for rejecting excess heat to the surrounding space environment. In the preferred form, the substrate comprises an array of panels adapted for folding movement between a reduced size stowed profile to fit, for example, within the cargo bay of a transport vehicle, and a deployed profile for normal use.

In the preferred arrangement of the invention, the solar collector comprises a solar reflector for focusing incident solar radiation upon a thermal powered generator unit. The preferred concentrator geometry is a Cassegrain configuration having a generally annular primary reflector surface of parabolic shape in combination with a secondary reflector surface of hyperbolic shape. These primary and secondary reflector surfaces are supported on a frame in a Cassegrain geometry to focus solar radiation upon a thermal receiver located generally at a central axis of the primary reflector surface. The thermal receiver functions in a manner known in the art to convert the focused radiation to heat, which is transferred to a heat exchange manifold containing a process fluid. The process fluid is thus heated by the collected radiation, and the process fluid drives a generator such as a turbine driven generator or the like to produce electrical power.

The multiple substrate panels are carried by the frame to project generally radially outwardly from the generator unit in interleaved relation. These panels are adapted to fold or collapse to the stowed profile fitting closely about the secondary reflector surface, or to deploy in the desired parabolic geometry for operation. When deployed, one side of these panels is presented generally toward the secondary reflector surface, and is appropriately coated with a suitable reflective film or the like.

The opposite or reverse sides of the substrate panels define the radiator in the form of a radiator surface of substantial area for rejecting excess heat from the system. This radiator surface is thermally coupled to the generator unit, preferably by means of heat pipes extending between each panel and the heat exchange manifold. In a related form, the thermal coupling could be accomplished by means of a pumped fluid heat exchange loop. In the preferred form, the heat pipes include inboard ends coupled thermally with the heat exchange manifold, outboard ends coupled thermally with the substrate panels, and intermediate flexible joint segments adapted to accommodate panel movement between the stowed and deployed positions.

Other features and advantages of the present invention will become more apparent from the following detailed description, taken in conjunction with the accompanying drawings which illustrate by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
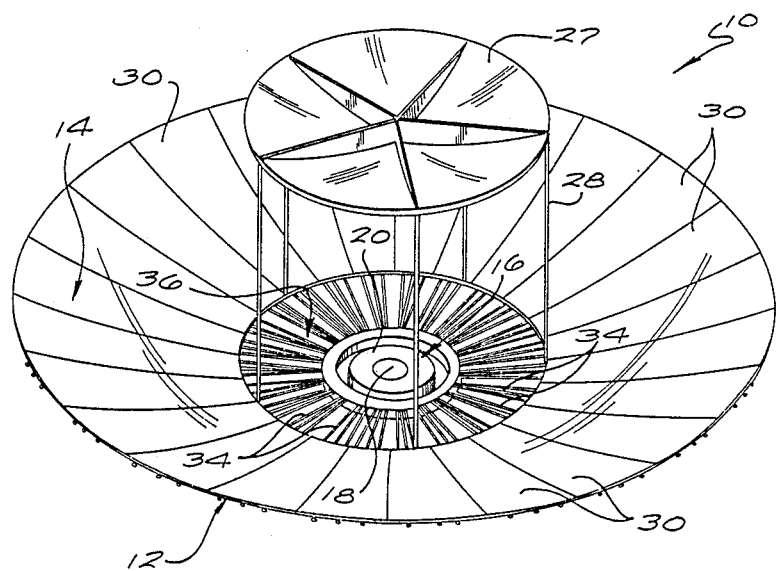
FIG. 1 is a somewhat schematic perspective view illustrating a combined solar concentrator and radiator assembly embodying the novel features of the invention and illustrating the assembly in a deployed state.

As shown in the exemplary drawings, a combined solar concentrator and radiator assembly referred to generally in FIG. 1 by the reference numeral 10 is provided for utilizing solar radiation energy as a power supply in an electrical power generation system. The combined solar concentrator and radiator assembly 10 advantageously integrates the function of solar radiation collection with the function of dissipating excess or waste system heat into a single lightweight package having a highly compact geometry. The invention is particularly suited for use in a space environment to generate electrical power for an accompanying satellite or other space vehicle (not shown).

Figure 2:
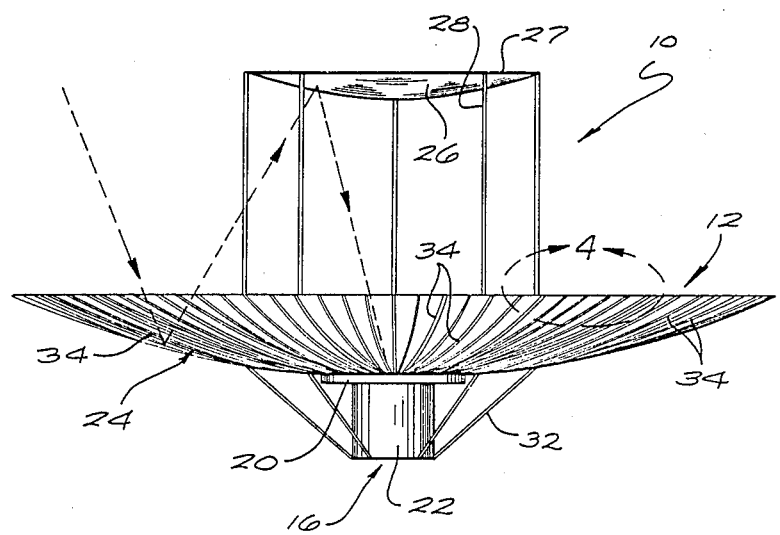
FIG. 2 is a side elevation view thereof.

In general terms, as viewed in FIGS. 1 and 2, the combined solar concentrator and radiator assembly 10 of the present invention includes a primary substrate 12 having a collector surface 14 on one side thereof for receiving incident solar radiation. The illustrative collector surface 14 shown in FIG. 1 comprises a mirrored reflector surface defining a solar reflector for focusing and concentrating incident solar radiation onto a thermal powered generator unit 16, thereby forming a so-called dynamic power generation system. As known in the art, the generator unit 16 comprises a receiver 18 for converting solar radiation focused thereon to heat energy which is transferred to a heat exchange manifold 20 containing an appropriate process fluid. The thus-heated process fluid drives an appropriate electrical generator 22, such as a conventional fluid-driven turbine driven generator or the like, to produce electrical energy. Excess or waste heat from the system is periodically dissipated from the manifold 20 to the surrounding environment via a radiator 24 (FIG. 2) defined on the side of the substrate 12 disposed opposite the collector surface 14.

More particularly, the preferred solar concentrator geometry as shown throughout the illustrative drawings comprises a solar reflector of the Cassegrain type, wherein the reflector surface 14 comprises a primary reflector surface. This primary reflector surface 14 has a generally annular shape with an upwardly presented concave geometry defined for reflecting incident solar radiation in a predetermined manner, with a parabolic contour being standard in the art. Incident solar radiation is reflected upwardly from the primary surface 14 for incidence upon a secondary reflector surface 26 formed on the underside of a secondary substrate 27 supported above the primary surface 14 by means of relatively narrow frame struts 28 or the like. The geometry of the secondary reflector surface is selected to reflect and focus the incident radiation downwardly upon the thermal receiver 18, with a downwardly convex and generally hyperbolic shape being known in solar concentrators of the Cassegrain type. The receiver 18 is positioned substantially at a central axis of the annular primary reflector surface 14.

The primary substrate 12 defining the primary reflector surface 14 is formed cooperatively by a plurality of interleaved or slightly overlapping fin-like panels 30. These panels 30 are supported as a group in any suitable manner as by additional frame struts 32 (FIG. 2) or the like to project generally radially outwardly from the generator unit 16 in surrounding relation thereto. These panels 30 are individually formed from a lightweight material such as a carbon wound composite and include an upwardly presented surface film or coating to define the reflector surface 14. This interleaved array of panels 30 beneficially permits panel movement as a group to a collapsed or folded state for compact storage as viewed in FIG. 6, wherein the panels 30 are folded generally upwardly toward the secondary reflector surface in close overlying parallel relation about the frame struts 28. In the stowed configuration, the entire concentrator/radiator package occupies a substantially minimum volume for efficient storage within the cargo bay of a launch and/or transport vehicle, such as the shuttle orbiter. When the concentrator/radiator assembly 10 is transported to a selected site for use, the panels 30 can be folded or deployed outwardly as a group to the deployed configuration shown in FIG. 1. The particular frame components and related panel connections for accommodating such movement of the panels 30 can vary widely and will be understood by those skilled in the art without express illustration in the accompanying drawings or further description herein.

Figure 3:
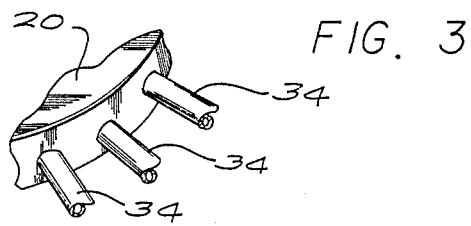
FIG. 3 is an enlarged fragmented perspective view illustrating connection of heat pipes to a heat exchange manifold.
Figure 4:
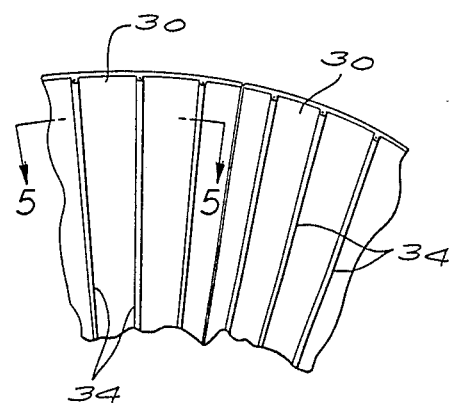
FIG. 4 is an enlarged fragmented view corresponding generally with the encircled region 4 of FIG. 2.
Figure 5:
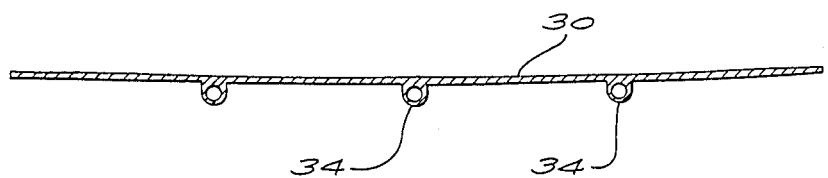
FIG. 5 is an enlarged sectional view taken generally on the line 5—5 of FIG. 4.

In accordance with a primary aspect of the invention, excess or waste heat arising from solar powered operation of the generator unit 16 is rejected to the surrounding environment via the radiator 24 defined on the reverse or undersides of the panels 30. In this regard, the underside of each panel 30 is thermally coupled by heat transfer means to the heat exchange manifold 20. The preferred heat transfer means comprises an outwardly radiating array of heat pipes 34 each having an inboard end anchored on the exterior of the manifold 20 in heat transfer relation therewith (FIG. 3). These heat pipes 34 project from the manifold 20 across the annular space 36 separating the panels 30 from the generator unit 16 to include outboard ends mounted in intimate heat transfer relation extending along the undersides of the panels 30. As viewed in FIGS. 4 and 5, at least one and preferably several heat pipes 34 are associated with each of the panels 30. The illustrative drawings show the heat pipes 34 mounted in a uniformly spaced array, with three heat pipes being mounted to each one of the substrate panels 30.

Figure 6:
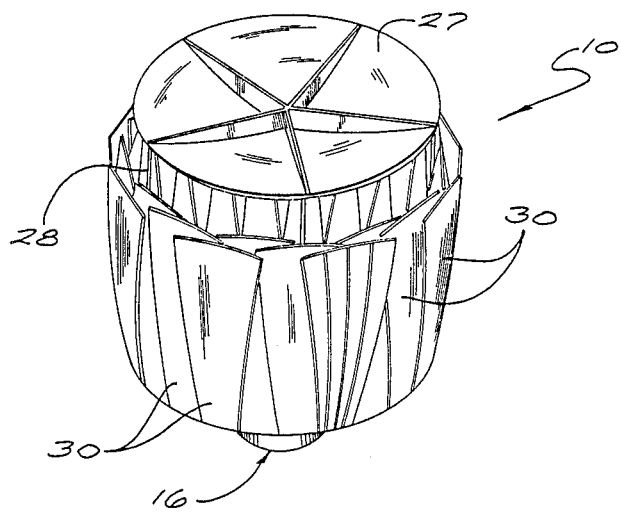
FIG. 6 is a somewhat schematic perspective view similar to FIG. 1, but illustrating the assembly in a stowed profile.
Figure 7:
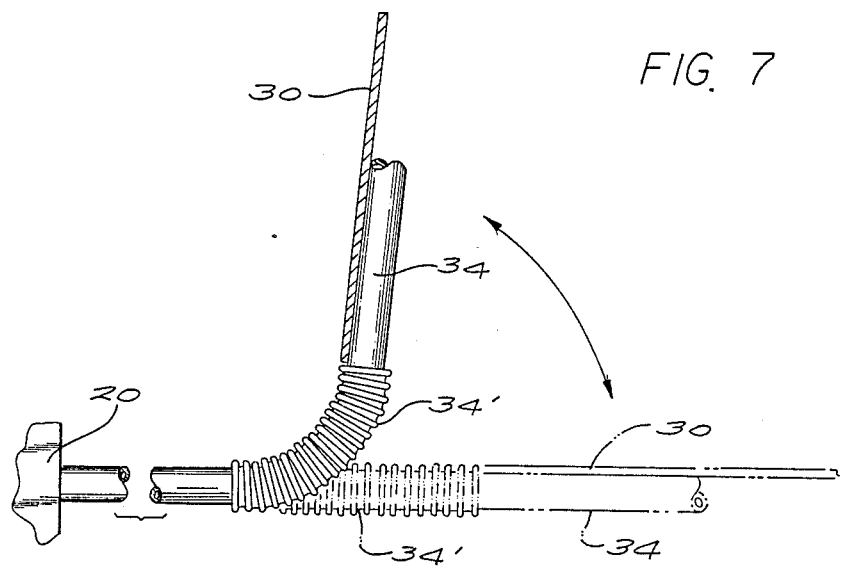
FIG. 7 is an enlarged fragmented and somewhat schematic view illustrating bending of the heat pipes to accommodate movement between stowed and deployed configurations.

As shown in FIGS. 6 and 7, the heat pipes 34 are designed for sufficient flexibility to accommodate panel movement between the stowed and deployed positions. In particular, the heat pipes each include a intermediate flexible joint segment 34' having sufficient flexibility to permit panel displacement between the stored position shown in solid lines in FIG. 7, and the outwardly radiating deployed position shown in dotted lines.

In use, when the panels 30 are deployed as viewed in FIGS. 1 and 2, the primary reflector surface 14 is oriented toward the sun to receive incident solar radiation. Such radiation is reflected in concentrated form to the secondary reflector surface 26 of smaller total area, which in turn reflects and concentrates the radiation upon the relatively small receiver 18. The receiver 18 is thus heated by the solar energy and the heat is transferred to the process fluid to operate the generator for producing electrical power. Excess heat is transferred by the heat pipes 34 to the radiator 24 on the undersides of the panels 30 for efficient dissipation.

The combination solar concentrator and radiator assembly 10 thus integrates the dual functions of solar collection and excess heat rejection into a single, compact structure. This compact arrangement is adapted for folding to the deployed configuration for efficient transport to a selected point of use. When deployed, an overall compact profile is presented, resulting in relatively high survivability when the system is used for example, to provide power to defense satellites. The survivability characteristics of the assembly can be further enhanced by appropriate material selection such as lightweight carbon composites, with the heat pipe 34 beneficially stiffening each panel 30. The arrangement further permits the stiffened panels to form an accurate reflector surface with minimum loss, thereby improving reflector efficiency and/or otherwise permitting a reflector of smaller size to be used. Moreover, the heat pipes 34 tend to distribute and dissipate heat relatively uniformly over the group of panels 30 to correspondingly minimize thermal gradients and potential thermal distortion.

Other features and advantages of the invention will be apparent to those skilled in the art. For example, while a Cassegrain type dynamic power system has been shown and described, it will be understood that alternative solar collection devices such as photovoltaic cells can be used with systems requiring excess heat rejection. Accordingly, no limitation on the invention is intended by way of the foregoing description and the accompanying drawings, except as set forth in the appended claims.

What is claimed:

1. A combined solar concentrator and radiator assembly, comprising:
   a solar concentrator having a substrate with first and second sides, said first side defining a reflector surface for reflecting incident solar radiation to a predetermined location, said substrate including a plurality of generally interleaved panels supported on a frame for movement between an extended deployed configuration and a relatively collapsed stowed configuration;
   a thermal power generator unit driven by the solar radiation reflected by said reflector surface; and
   a radiator for dissipating heat from said generator unit, said radiator including a radiator surface disposed over at least a portion of said second side of said substrate, and means for coupling said radiator surface in heat transfer relation with said generator unit, said coupling means including a plurality of heat pipes each having an inboard end coupled to said generator unit, an outboard end coupled to said radiator surface, and an intermediate flexible joint segment to accommodate movement of said panels between said deployed and stowed configurations.

2. A combined solar concentrator and radiator assembly, comprising:
   a solar concentrator having a substrate with first and second sides, said first side defining a reflector surface for reflecting incident solar radiation to a predetermined location;
   a thermal power generator unit driven by the solar radiation reflected by said reflector surface;
   a radiator for dissipating heat from said generator unit, said radiator including a radiator surface disposed over at least a portion of said second side of said substrate, and means for coupling said radiator surface in heat transfer relation with said generator unit;
   said solar concentrator comprising a Cassegrain reflector, said substrate first side defining a primary reflector surface of generally parabolic shape formed about a central axis, and further including means forming a secondary reflector surface of generally hyperbolic shape in spaced relation with and presented generally toward said primary reflector surface, said thermal power generator unit being positioned generally at said central axis of said primary reflector surface;
   said thermal power generator unit comprising a thermal receiver disposed generally at said central axis for converting concentrated solar radiation incident thereon to heat, a heat exchange manifold thermally coupled to said receiver and containing a process fluid, and a generator driven by said process fluid;
   said coupling means comprising a plurality of heat pipes coupled thermally between said manifold and said substrate second side; and
   each of said heat pipes having an inboard end coupled thermally to said manifold, an outboard end coupled thermally to said substrate second side, and an intermediate flexible joint segment, said substrate comprising an array of interleaved panels adapted for folding movement between an extended deployed configuration and a relatively collapsed stowed configuration, said heat pipes accommodating said folding movement.

3. The assembly of claim 2 wherein a plurality of said heat pipes are coupled to each one of said panels.

4. A combined solar concentrator and radiator assembly, comprising:
   a substrate having an extended surface area and defining a first side and a second side, said substrate including a plurality of generally interleaved panels supported on a frame for movement between an extended deployed configuration and a relatively collapsed stowed configuration;
   solar collector means on said first side of said substrate and including means for receiving incident solar radiation for use in the generation of electrical power;
   heat source means;
   a radiator for dissipating excess heat generated by said heat source means, said radiator including at least one heat pipe coupled thermally between said heat source means and said second side of said substrate, and a radiator surface extending over at least a substantial portion of said second side of said substrate, said at least one heat pipe having an inboard end coupled to said generator unit, and outboard end coupled to said radiator surface, and an intermediate flexible joint segment to accommodate movement of said panels between said deployed and stowed configurations.

5. The assembly of claim 4 wherein said substrate comprises a solar reflector, and wherein said heat source means comprises a thermal power generator unit.

6. The assembly of claim 4 wherein said substrate comprises a portion of Cassegrain solar reflector.

7. A combined solar concentrator and radiator assembly, comprising:

a solar reflector of Cassegrain geometry including a primary substrate having first and second sides, said first side of said primary substrate defining a primary reflector surface, and further including a secondary substrate defining a secondary reflector surface spaced from and presented generally in a direction toward said primary reflector surface;

said primary reflector surface having a shape to reflect incident solar radiation to said secondary reflector surface, and said secondary reflector surface having a shape to reflect the incident solar radiation to a predetermined point, said primary substrate having a generally annular shape oriented about a central axis, with said predetermined point being disposed substantially at said central axis;

said primary substrate being further defined by a plurality of interleaved panels adapted for folding movement between a stowed configuration folded relatively closely about said secondary substrate, and a deployed configuration;

a thermal receiver mounted substantially at said predetermined point for converting incident solar radiation to heat energy;

a heat exchange manifold coupled thermally to said receiver and having a process fluid therein for heating in response to conversion of solar radiation to heat energy by said receiver;

a generator driven by said process fluid when heated to generate electrical power; and heat transfer means for thermally coupling said manifold to said second side of said primary reflector such that said second side defines a radiator surface for dissipating excess heat, said heat transfer means including a plurality of heat pipes each having a flexible segment to accommodate folding movement of the said panels.

8. The assembly of claim 7 wherein a plurality of said heat pipes are coupled to each one of said panels.

* * * * *

UNITED STATES PATENT AND TRADEMARK OFFICE
CERTIFICATE OF CORRECTION

PATENT NO.  : 4,947,825

DATED       : August 14, 1990

INVENTOR(S) : Michael P. Moriarty

It is certified that error appears in the above-identified patent and that said Letters Patent is hereby corrected as shown below:

On the Cover Page, Column 2, Line 7, beginning with "Attorney, Agent, or Firm", please delete "Frederick" and replace with --Fredrick--.

On the Cover Page, in the "ABSTRACT", Column 2, Line 16, delete the word "reflelctor" and replace with --reflector--; and on Line 17, delete the word "ration" and replace with --radiation--.

Signed and Sealed this

Seventh Day of January, 1992

Attest:

HARRY F. MANBECK, JR.

*Attesting Officer*                *Commissioner of Patents and Trademarks*